United States Patent [19]
Hoyler

[11] 3,740,548
[45] June 19, 1973

[54] CONTROL OF AN INTERLOCKING IN A VEHICLE CONTROL SYSTEM

[75] Inventor: Robert C. Hoyler, Pittsburgh, Pa.

[73] Assignee: Westinghouse Electric Corporation, Pittsburgh, Pa.

[22] Filed: June 25, 1971

[21] Appl. No.: 156,908

[52] U.S. Cl.................................... 246/3, 246/134
[51] Int. Cl............................................ B61l 27/00
[58] Field of Search......................... 246/134, 131, 3

[56] References Cited
UNITED STATES PATENTS 3,219,815  11/1965  Livingston ....................... 246/134 X
3,234,377  2/1966  Davison et al. .................. 246/133 X
3,553,449  1/1971  Hathaway ............................... 246/3

Primary Examiner—Robert G. Sheridan
Assistant Examiner—George H. Libman
Attorney—F. H. Henson, R. G. Brodahl and Jack M. Arnold

[57] ABSTRACT

Fail-safe electronic logic elements having unidirectional failure modes are used in the construction of a fail-safe logic circuit which controls the interlocking in a vehicle control system. The logic circuits provide control signals for properly aligning the interlocking such that vehicles which are operational in the system may travel along selected vehicle travel routes. There are also provided a group of status signals which are indicative of whether or not it is safe for a vehicle to enter the interlocking zone.

6 Claims, 8 Drawing Figures

CONTROL OF AN INTERLOCKING IN A VEHICLE CONTROL SYSTEM

CROSS REFERENCES TO RELATED APPLICATIONS

Reference is made to the following U.S. Patents and copending patent applications: U.S. Pat. No. 3,593,022 entitled "Control of a Vehicle Along a Path Divided into a Plurality of Signal Blocks," Ser. No. 762,563 and filed Sept. 25, 1968 on behalf of Robert C. Hoyler and George M. Thorne Booth. "Control of Vehicle Systems," Ser. No. 840,349 and filed on July 9, 1969 on behalf of Albert F. Harsch and Kenneth M. Dale. U.S. Pat. No. 3,600,604 entitled "Fail-Safe Logic Gates," Ser. No. 780,662, filed Dec. 3, 1968 on behalf of George M. Thorne Booth. "Fail-Safe OR Gates," Ser. No. 116,751, filed Feb. 19, 1971 on behalf of Thomas C. Mattey, which application is now abandoned,. The above-named patent applications are each assigned to the assignee of the present invention.

BACKGROUND OF THE INVENTION

An interlocking is an area in a vehicle control or transit system where one vehicle travel route may diverge into two or more vehicle travel routes or conversely two vehicle travel routes may converge into one vehicle travel route. As is known in the art, a switch in the interlocking controls the movement of the rails which in turn controls the vehicle travel route over which a vehicle is to travel. There is a basic requirement for safety in such a system as there are various dangers which are likely to occur. Namely, a switch in the interlocking may be moved directly under a vehicle such that the vehicle could be derailed. Also, a vehicle which has not yet reached the interlocking may be moving at a rate of speed at which it will enter the interlocking and the moving switch prior to the switch being aligned and locked in its selected position. It is clear that this type of a situation may also result in a derailment of the vehicle. Also, if there are two or more vehicles traveling along a vehicle travel path, which may be comprised of two or more vehicle travel routes, it must be assured that the vehicles are not allowed to enter into conflicting vehicle travel routes such that there may be a collision of the vehicles and perhaps a resultant derailment of the vehicles which may in turn result in a loss of property or life.

In the prior art, the solution to the problems created by the above-named dangers was solved by the use of vital relays. A vital relay is a relay which has a unidirectional mode of failure. That is, in any case of failure of the relay there is a resultant loss of the signal output from the relay and the circuits that are designed using the relays therefore have no signal output. As a result an interlocking may not be moved in case of a failure of a relay or alternatively a signal directing a vehicle into a particular vehicle travel route is interrupted in the event of a failure of one of these relays.

As is known, the vital relay is a device which has a magnetic coil which is energized by a control signal which supplies current to the magnetic coil which in turn lifts an armature closing a contact through which the output signal flows for the resultant control of the interlocking. If the coil fails or if there is a loss of power with the resultant absence of current being applied to the coil the relay is designed such that the armature drops due to the influence of gravity and, therefore, there is no resultant output signal. Further, the relays are designed with contacts through which the output signal flows which are made out of carbon compounds such that the contacts can't weld together due to excessive current flowing through them which would result in their remaining in a closed condition during the absence of the application of a control signal whereby the coil would become deenergized. In the manufacture of these vital relays, heavy duty contacts are used, the pivots upon which the armatures move are constructed such that they do not freeze or seize such that in all cases of failure, it is insured the armature will drop and the contacts through which the output signal flows will open. As was previously mentioned, through the proper use of these vital relays and their unidirectional modes of failures relay circuitry may be constructed for an interlocking system such that fail-safety for the interlocking is at all times insured.

These vital relays however, have numerous disadvantages, namely the relays are large and cumbersome therefore they require a large amount of space for housing such that a resultant interlocking circuit made of these relays is rather large and bulky. Also, the relays are relatively expensive, have high power requirements and contribute to a more expensive interlocking circuit than would be possible if electronic elements could be used having the proper fail-safe features.

The teachings of the present invention provide an electronic logic circuit for an interlocking which has the required fail-safe and unidirectional failure modes and which is less expensive, requires less power to operate, and may be housed in a relatively small area.

SUMMARY OF THE INVENTION

According to the teachings of the present invention, there is provided method and apparatus for control of an interlocking in a vehicle control system wherein a vehicle travels along a vehicle travel path which is divided into a plurality of vehicle detection zones and which includes at least first and second vehicle travel routes, with an interlocking included in at least one of the vehicle detection zones, which interlocking may be aligned in a first position for vehicle travel along the first vehicle travel route, and which may be aligned in second position for vehicle travel along the second vehicle travel route. There is apparatus for providing a vehicle travel route request for a particular vehicle which request is indicative of the vehicle travel route along which the vehicle is to travel. There also is included apparatus which is responsive to the interlocking being aligned in the position necessary to meet the vehicle travel route request which in turn permits the vehicle to enter the one vehicle detection zone. Further there is included apparatus which is responsive to the interlocking not being aligned in the position necessary to meet the vehicle travel route request concurrent with the sensing of the absence of another vehicle in the one vehicle detection zone for allowing the proper alignment of the interlocking to meet the vehicle travel route request.

DESCRIPTION OF THE PREFERRED EMBODIMENT

Figure 1:
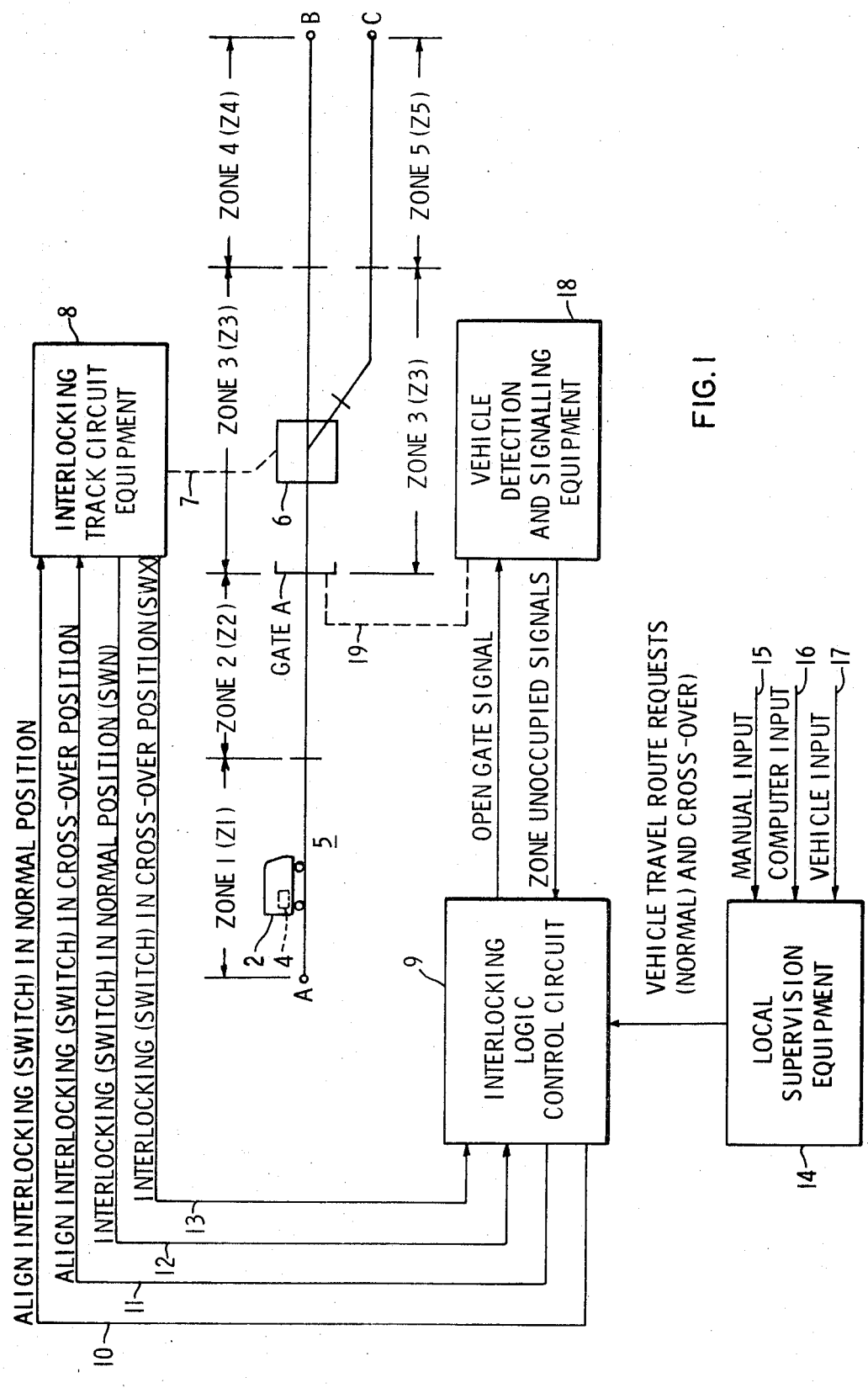
FIG. 1 is a schematic and block diagram representation of a vehicle travel path which includes two vehicle travel routes and an interlocking which is controlled by the logic elements shown in block diagram form for controlling the interlocking and the resultant movement of the vehicle along the vehicle travel path.

In FIG. 1 there is illustrated a vehicle 2 which may comprise a plurality of vehicle cars one car of which contains transmitting and receiving apparatus 4 for communication with vehicle detection and signalling equipment located along the vehicle travel path wayside. A vehicle travel path 5 is divided into two vehicle travel routes respectively. The first vehicle travel route is from the point A to the point B and the second vehicle travel route is from the point A to the point C. An interlocking or switch 6 mechanically aligns the tracks or rails along which the vehicle travels such that if the interlocking or switch 6 is aligned in a first position the vehicle 2 travels along the vehicle travel route from point A to point B and if the interlocking 6 is aligned in a second position, the vehicle is then permitted to travel along the second vehicle travel route from point A to point C.

The interlocking 6 is a mechanical device which is well known in the art and therefore is schematically illustrated by the box 6. The interlocking 6 is mechanically connected to an interlocking track circuit equipment apparatus 8 by way of a mechanical linkage 7. The apparatus 8 is an electromechanical device which is also well known in the art for controlling the movement of the interlocking 6. The apparatus 8 communicates with an interlocking logic control circuit 9 for receiving control or command signals from the logic control circuit for controlling the movement of the interlocking 6 and in turn the apparatus 8 sends back status signals which are indicative of the travel route position that the interlocking is presently in. For example, a control or command signal "align interlocking (switch) in normal position," is coupled via a line 10 to the apparatus 8 for energizing the apparatus 8 which in turn aligns the interlocking 6 in the normal position for vehicle travel from point A to point B. Likewise a control or command signal is coupled via a line 11 which is the signal "align interlocking (switch) in crossover position" which signal energizes the apparatus 8 to move the interlocking 6 to the crossover position, that position being such that the vehicle travels from the point A to the point C. The status signals then are transmitted via lines 12 and 13 to the interlocking logic control circuit 9, the first status signal being, "interlocking (switch) in normal position (SWN)" which is indicative of the interlocking being in the normal position such that the vehicle may travel from position A to position B. The second status signal is the "interlocking (switch) in crossover position (SWX)" which is indicative of the interlocking 6 being in a position such that the vehicle may travel over the vehicle travel route from position A to position C.

The interlocking logic control circuit receives vehicle travel route requests, for example a normal travel route route request when it is desired that the vehicle travels from point A to point B and a crossover (X-over) vehicle travel route request when it is desired for the vehicle to travel from point A to point C. These travel route requests are provided by local supervision equipment 14 which for example may be a plurality of logic gates. A crossover vehicle route request informs the interlocking logic control circuit 9 that the interlocking is requested to be moved from the normal position to the crossover position, if the interlocking is not already in the crossover position normal vehicle route travel request is indicative of the vehicle requesting to travel along the normal vehicle travel route from position A to position B. The local supervision equipment 14 may be controlled by one of a plurality of different devices. For example, there may be a manual input by way of a line 15 for example, from a keyboard apparatus which controls the scheduling and the movements of the vehicles along the vehicle travel routes. Alternatively there may be a computer input via a line 16 wherein the vehicle movement is computer controlled as described in the above-mentioned patent application Ser. No. 840,349, or there may be vehicle travel route request signals from the vehicle itself via a line 17 which signals are received from the transmitter and receiver apparatus 4 aboard the vehicle. In this instance the vehicle itself provides the signal which is indicative of the vehicle travel route the vehicle wishes to take.

The interlocking logic control circuit 9 also communicates with a vehicle detection and signalling equipment 18 which for example may be detection and signalling equipment as described in the previously mentioned U.S. Pat. No. 3,593,022. The apparatus 18 receives open gate signals from the logic control circuit 9, which signals are indicative of the vehicle travel route being clear and the interlocking 6 being properly aligned and locked such that the vehicle may travel along the vehicle travel route requested. The signalling equipment 18 transmits zone unoccupied signals to the logic circuit 9, which signals are indicative of the vehicle detection zones 1 through 5 as illustrated as being unoccupied during certain time intervals. It is to be appreciated that the detection and signalling equipment which is illustrated by the one circuit block 18 is in practice a plurality of signalling and detection apparatus situated adjacent each of the vehicle detection zones illustrated. In some vehicle control apparatus the vehicle detection zones are one and the same as the control circuit signal blocks as described in the U.S. Pat. No. 3,593,022. It is, however, to be appreciated that the vehicle detection zone may be different in length than the vehicle control zones as shown in the last mentioned patent application. The signalling equipment 18 controls the gate A as shown by the lines in phantom 19. A gate is well known in the vehicle control art and for example, in a computer control system may consist of a zero speed command if the gate is closed or alternatively if the gate is opened a predetermined speed command is transmitted to the vehicle. Alternatively, the gate may be a signal device which gives a visual green indication if the gate is opened or alternatively a visual red indication if the gate is closed. In early vehicle control systems such as those found in the railroad arts, the gates at one time were mechanical devices that were physically moved across the track and did not permit the vehicle to pass when the gate was closed and alternatively the mechanical device was lifted when the gate was opened.

Figure 2:
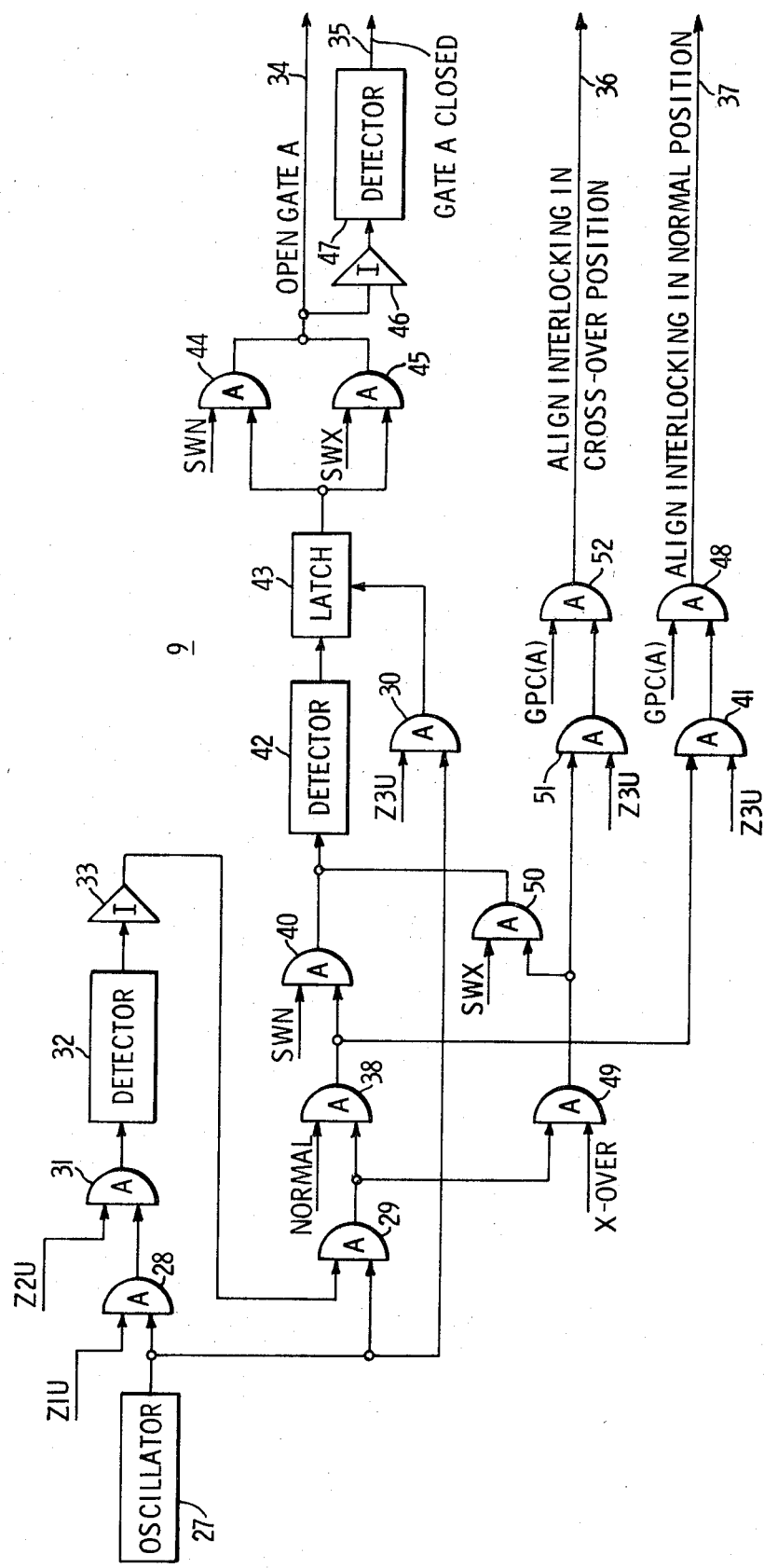
FIG. 2 is a block diagram of the interlocking logic control circuit of FIG. 1, which embodies the teachings of the present invention.

Refer now to FIG. 2 which forms part of the logic control circuit 9 which was illustrated in FIG. 1. The logic circuitry shown is made up of fail-safe electronic logic devices which have unidirectional failure characteristics similar to those found in vital relays. There are four possible conditions that may exist when a vehicle travel route request is made by the vehicle or one of the other previously named means, for travel over one of the two possible vehicle travel routes. The first condition is when the vehicle requests a normal vehicle travel route which is the route from position A to position B and the interlocking is aligned in the normal position. The second condition is when the normal vehicle travel route request is entered and the interlocking is aligned in the crossover position and must therefore be returned to the normal position such that the normal vehicle travel route request may be met by the system. The third condition is when a crossover vehicle travel route request is entered such that the vehicle may travel along the second vehicle travel route from position A to position C and the interlocking is aligned in the crossover position. The fourth condition which may exist is when the crossover vehicle travel route request is entered and the interlocking or switch is in the normal position and must therefore be realigned or moved to the crossover position such that the vehicle travel route request may be met by the system.

Figure 5:
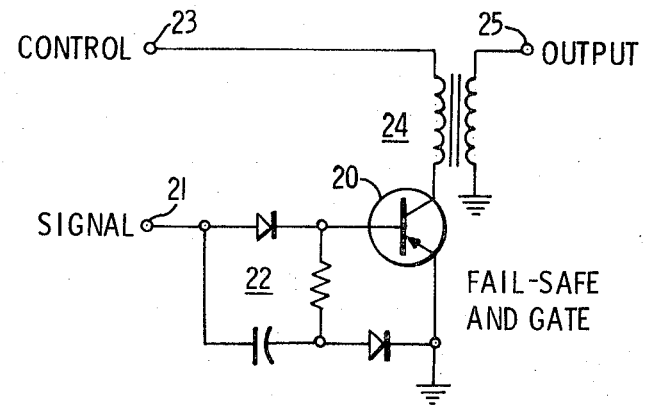
FIG. 5 is an AND gate which may be used in the practice of the present invention.

Prior to the description of the logic circuit of FIG. 2 the operation of fail-safe AND gates and latches as used in the logic circuit will be described. Refer briefly to FIG. 5 which is a schematic illustration of a fail-safe AND gate which may be used in the practice of the invention and which is described in detail in the previously mentioned U.S. Pat. No. 3,600,604. The AND gate is comprised of a PNP transistor 20 which has a first signal input 21 connected to the base of the transistor by way of a level shift network 22. The second signal input of the AND gate is from a control terminal 23 to the collector of the transistor by way of the primary winding of a transformer 24. The output terminal 25 of the AND gate is connected to the secondary of the transformer 24. The signal applied to the input terminal 21 in practice is a periodic signal which may for example be at a frequency of 155 kilohertz. If concurrent with the application of the periodic signal to the input 21 there is applied a negative control signal to the terminal 23, the transistor 20 becomes conductive and the signal applied to the terminal 21 is essentially reproduced at the output terminal 25. In the event there is a loss of signal at either the terminal 21 or the terminal 23, there is no output signal provided at the terminal 25. For all cases of circuit element failures, the circuit is designed such that there is no signal produced at the output terminal 25.

Figure 6:
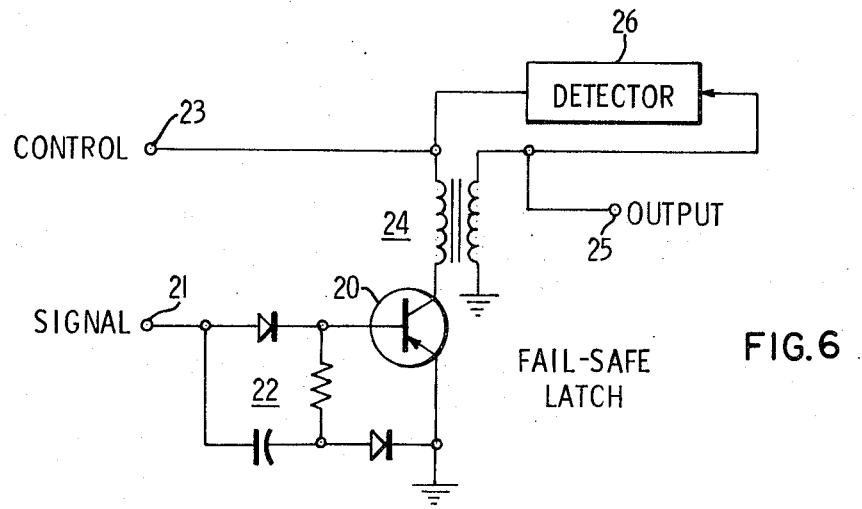
FIG. 6 is an electronic latch circuit which may be used in the practice of the present invention.

Refer briefly to FIG. 6 which illustrates a fail-safe electronic latch circuit which may be used in the practice of the invention. This circuit is essentially identical to the fail-safe AND gate illustrated in FIG. 5 with the addition of a detector device connected between the output of the AND gate and the control terminal of the AND gate. Like circuit elements in FIG. 6 will be given like numeral designations as the like circuit elements in FIG. 5. As was the case with the fail-safe AND gate there must be a signal present at the terminal 21 concurrent with the application of the negative control pulse at the terminal 23 such that the signal at terminal 21 is essentially reproduced at the output terminal 25. The periodic signal produced at the output terminal 25 is detected by a detector 26 which applies a negative control pulse to the primary of the transformer 24 which makes the transistor 20 conductive after the control signal is removed from the terminal 23. In other words, a finite amount of time after a control signal is applied to the terminal 23 the output signal produced at terminal 25 is detected and the output signal provided by the detector holds the transistor 20 conductive as long as a signal input remains at the terminal 21. However, as soon as the signal is removed from the terminal 21 and there is no control signal applied to the terminal 23, the transistor 20 becomes non-conductive and no output signal is produced at the terminal 25 and in turn there is no negative pulse produced by the detector 26. Therefore, the latch circuit does not produce an output signal again until a control signal is applied to the terminal 23 concurrent with the periodic signal being applied to the terminal 21.

Returning to FIG. 2, an oscillator 27 provides a 155 kilohertz signal to the signal inputs of AND gates 28, 29 and 30. The control input to the AND gate 28 is a zone 1 unoccupied (Z1U) signal which is provided from the vehicle detection and signalling equipment 18 (as shown in FIG. 1). In the event there is the absence of a vehicle in zone 1 the AND gate 28 therefore provides a 155 kilohertz signal at its output which is provided to the signal input terminal of an AND gate 31. The control terminal of the AND gate 31 receives a zone 2 unoccupied (Z2U) signal in the event there is no vehicle present in vehicle detection zone 2. In response thereto, the AND gate 31 provides a 155 kilohertz signal at its output which in turn is coupled to the input of a detector 32 and in response to the latter input signal provides a negative signal to the input of an inverter 33 which in turn provides a zero input signal to the control terminal of the AND gate 29. The AND gate 29 therefore is disabled and provides no output control signal to any of the following logic elements to which it is connected. Therefore, there is no open gate A signal provided at the output terminal 34. However, a gate A closed signal is provided at the output terminal 35. This will be explained in detail subsequently. Also, since gate 29 is disabled, there is no align interlocking in crossover position command signal provided at the output terminal 36, and also there is no align interlocking in normal position command signal provided at output terminal 37 as will be explained shortly.

Consider now the first condition of operation for a vehicle which is to travel along the first vehicle travel route from position A to position B, as shown in FIG. 1, and the vehicle requests the normal vehicle travel route and the interlocking or switch 6 (as shown in FIG. 1) is in the normal position. If the vehicle is in vehicle detection zone 1, (Z1) there is no zone 1 unoccupied (Z1U) signal provided to the control input terminal of the AND gate 28 and the AND gate 28 therefore is disabled and no signal is provided to the signal input terminal of the AND gate 31 which in turn is disabled and provides no signal input to the detector 32. The inverter 33 in response to no signal input from the detector 32 provides a negative control signal to the control input terminal of the AND gate 29 and the AND gate 29 now provides a 155 kilohertz control signal to the signal input terminal of an AND gate 38. Since a normal vehicle travel route request (NORMAL) has been entered, the local supervision equipment 14 (as shown in FIG. 1) provides a negative control signal to the control input terminal of the AND gate 38 and in response thereto a 155 kilohertz signal is produced at the output of the AND gate 38 which latter signal in turn is provided to the signal input terminal of an AND gate 40 and an AND gate 41. As was previously mentioned, the interlocking or switch is in the normal position, therefore the control input terminal of the AND gate 40 is receiving an interlocking (switch) in normal position (SWN) negative control signal from the interlocking track circuit equipment 8 (as shown in FIG. 1). In response thereto, the AND gate 40 provides a 155 kilohertz signal to the input of a detector 42 which in response to the latter signal provides a negative control signal to the control terminal of an electronic latch circuit 43. The AND gate 30 as was mentioned previously, has a 155 kilohertz signal provided to its signal input terminal. The control terminal of this AND gate receives a zone 3 (Z3U) unoccupied signal from the vehicle detection and signalling equipment 18, (as shown in FIG. 1). It is assumed that zone 3 is unoccupied at this time and the AND gate 30 therefore is enabled and in turn provides a 155 kilohertz signal to the signal input terminal of the latch 43. The latch in response thereto provides a 155 kilohertz signal to the signal input terminals of AND gates 44 and 45. Also, as was explained in reference to FIG. 6, the 155 kilohertz signal at the output of the latch circuit is detected and fed back to the control to the latch to hold the latch on once the control signal from the detector 42 is terminated. As was mentioned earlier, since the interlocking is in the normal position, therefore the interlocking (switch) in normal position signal (SWN) is provided to the control input terminal of the AND gate 44 and a 155 kilohertz signal is provided at its output terminal. The open gate A signal which is provided at the output terminal 34 is coupled from the interlocking logic control circuit 9 to the vehicle detection and signalling equipment 18 (as shown in FIG. 1) which in response to the latter signal opens the gate A and permits the vehicle to enter zone 3 and pass through the interlocking 6 which is now in the normal position and proceed to its final position B. The open gate A signal is also provided to the input of an inverter 46 which provides an output signal to a detector 47 which in turn provides a zero output signal for the gate A closed signal at the output terminal 35. The gate A closed signal is used in the gates properly close circuit of FIG. 8 and the operation of this latter logic circuit will be explained shortly. Once the vehicle enters zone 3, there is no zone 3 unoccupied signal (Z3U) signal provided to the control input terminal of the AND gate 30 and the AND gate 30 therefore is disabled as is the latch 43 and the AND gate 44 and accordingly no open gate A signal is provided at the output terminal 34. In response to the absence of the latter signal a gate A closed signal is provided at the output terminal 35. It is necessary that the gate A is closed once the vehicle enters zone 3 such that no following vehicle is allowed to enter zone 3 while the first vehicle is still present.

Now consider the second operational condition when the vehicle requests a normal route from position A to position B and the interlocking or switch 6 is in the crossover position. The operation of the circuit through AND gate 38 is the same as was previously described. However, the AND gate 40 now is receiving no interlocking (switch) in normal position (SWN) signal at its control input terminal and the AND gate 40 therefore is disabled. It follows from the previous explanation that since the AND gate 40 is at this time disabled there is no open gate A signal provided at the output terminal 34 and there is a gate A closed signal provided at the output terminal 35. As was mentioned earlier, the signal output from the AND gate 38 is also connected to the signal input terminal of the AND gate 41. The control input terminal of the latter AND gate receives a zone 3 unoccupied (Z3U) signal from the vehicle detection and signalling equipment 18 (as shown in FIG. 1). It is assumed that zone 3 is unoccupied at this time and the AND gate 41 therefore provides a 155 kilohertz signal to the signal input terminal of an AND gate 48. The control input terminal of this latter AND gate receives a gate properly closed GPC (A) signal from the gates properly closed logic circuit. For the time being assume that the gates are properly closed and this signal is present enabling the AND gate 48 to provide a 155 kilohertz signal at its output terminal to the output terminal 37. As was previously described, this is an "align interlocking in normal position" command signal which is coupled to the interlocking track circuit equipment 8 as shown in FIG. 1. The apparatus 8 in response to the latter signal moves or aligns the interlocking from the crossover to the normal position. Once the interlocking is aligned and properly locked in the normal position, the interlocking (switch) in normal position (SWN) signal is provided from the interlocking track circuit equipment 8 to the interlocking logic control circuit 9 and the AND gate 40 is once again enabled and an open gate A signal is provided at the output terminal 34 in accordance with the operation of the circuit as was previously described for the condition when the switch was originally aligned in the normal position.

Consider now the systems operation when the vehicle initiates the vehicle travel request for the third condition of operation namely, that the vehicle transmits a vehicle travel crossover request for travel from position A to position C and the interlocking or switch 6 is properly aligned in the crossover position. Since the vehicle has entered the crossover request and is in either zone 1 or zone 2, the AND gate 29 is enabled as was previously described and is providing a 155 kilohertz control signal to the signal input terminals of the AND gate 38 and the AND gate 49. Since a vehicle travel crossover route request has been made, there is no normal vehicle travel route request (normal) and accordingly a zero input signal is applied to the control terminal of the AND gate 38 which disables this AND gate. This is necessary since as was previously explained, the output of the AND gate 38 is used for providing signals to control the operation of the circuit when a normal vehicle travel route request has been entered. Since however, a vehicle travel crossover route request has been entered, a negative signal (X-over) indicative of this request is applied to the control input terminal of the AND gate 49 and in response thereto a 155 kilohertz output signal is provided to the signal input terminals of an AND gate 50 and an AND gate 51. Since for this third condition of operation, it has been assumed that the interlocking or switch 6 is in the crossover position the control terminal of the AND gate 50 is receiving an interlocking (switch) in crossover position (SWX) signal at this time which enables the AND gate 50 to provide a 155 kilohertz signal to the input of the detector 42. In response to the latter input signal the detector 42 provides a negative control signal to the control terminal of the latch 43. The latch at this time is receiving a 155 kilohertz input signal from the AND gate 30 as it is assumed that vehicle detection zone 3 is unoccupied at this time. Since the interlocking is in the crossover position at this time, the AND gate 45 is enabled to pass the provided 155 kilohertz signal from the latch 43 and in turn an open gate A signal is provided at the output terminal 34 which is coupled to the vehicle detection and signalling equipment 18 and the gate A is opened in response thereto. The Vehicle is then allowed to enter zone 3 through the interlocking 6 and to travel on to position C.

The fourth condition of system operation occurs when the vehicle initiates a vehicle crossover request and the interlocking is aligned in the normal position and therefore must be realigned to the crossover position prior to the vehicle being allowed to enter vehicle detection zone 3. As was previously described, the AND gate 49 is providing at this time a 155 kilohertz control input signal to the signal input terminals of the AND gates 50 and 51. Since the interlocking is in the normal position at this time, the SWX signal which is applied to the control terminal of the AND gate 50 is at a zero level and the latter AND gate therefore is disabled at this time. The AND gate 51 however, is receiving a zone 3 unoccupied signal (Z3U signal) from the vehicle detection and signalling equipment 18 and in response thereto the AND gate 51 provides a 155 kilohertz signal to the signal input terminal of an AND gate 52. The AND gate 52 is receiving a gate properly closed, GPC (A) signal at this time at its control terminal and in response thereto provides a 155 kilohertz "align interlocking in crossover position" command signal via the output terminal 36 to the interlocking track circuit equipment 8 (as shown in FIG. 1) and in response to this latter command signal, the interlocking is realigned from the normal position to the crossover position. In response to the proper realignment of the interlocking the AND gate 50 now once again receives the negative SWX control signal and in response thereto the circuit operates as previously explained to provide an open gate A signal at the output terminal 34. The system operation for the 4 possible conditions of operation have now been described in detail and it should be clear that the logic circuit described operates in a fail-safe manner since the failure of any of the AND gates or latches provided always results in a zero output signal condition. It follows therefore that no unsafe control or command signals for interlocking control may be initiated in the event of the failure of a logic element.

Figure 3:
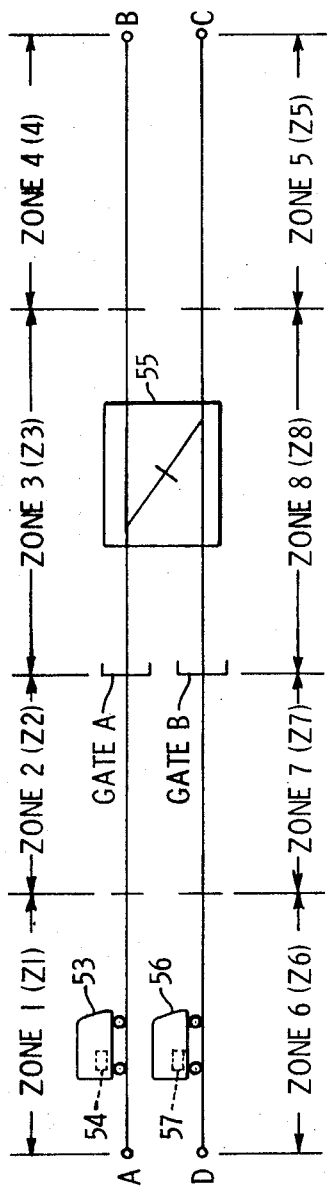
FIG. 3 is a schematic representation of another vehicle travel path which is divided into a plurality of vehicle travel routes.

In FIG. 3, there is illustrated a slightly more complex vehicle travel path configuration in which parallel running tracks are connected together in a predetermined vehicle detection zone such that a vehicle traveling on one vehicle travel route may be switched to another vehicle travel route over which the second vehicle normally travels. For example, a vehicle 53 which includes transmitting and receiving apparatus 54 may travel along a first or normal vehicle travel route from position A to position B when an interlocking or switch 55 is aligned in the normal position. A vehicle such as the vehicle 56 which includes transmitting and receiving apparatus 57 may travel in a parallel direction from position D to position C when the interlocking 55 is in the normal position. When, however, the vehicle 53 makes a vehicle crossover travel route request the interlocking 55 is aligned in the crossover position and the vehicle 53 is permitted to travel from position A to position C whereas the vehicle 56 is not permitted to enter the vehicle detection zone 8 (Z8) and is stopped prior to its reaching gate B. The interlocking or switch 55 is shown in schematic form and such a switch is well known in the art for switching rails in such a vehicle travel path configuration and therefore needs no detailed description here.

Figure 4:
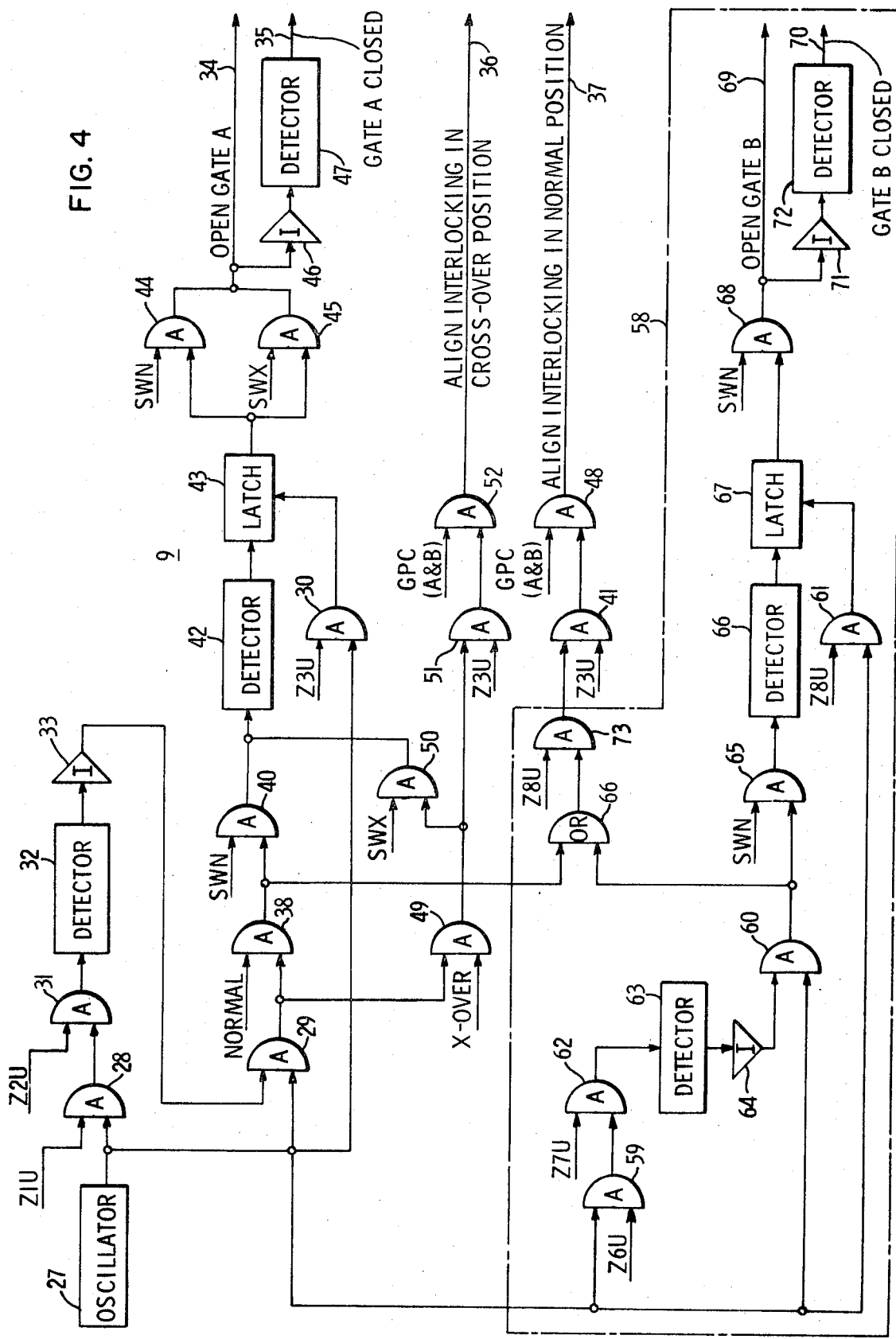
FIG. 4 is a block diagram representation of the interlocking logic control circuit necessary to control the interlocking for the vehicle travel path as illustrated in FIG. 3.

FIG. 4 illustrates the interlocking logic control circuit needed to provide the proper control and command signals for the movement of the interlocking 55 and the opening and closing of the gate A and B as shown in FIG. 3. The upper portion of the logic control circuit is identical with the logic control circuit illustrated in FIG. 2 and the like elements are given the same numeral designations as were used for FIG. 2. The logic block 58 includes the logic elements that must be added for proper control of the new track rail switching configuration illustrated in FIG. 3. Therefore, the operation of the previously described circuit elements are the same and will not be explained again in conjunction with FIG. 4.

Consider a first condition in which the vehicles 53 and 56 enter normal vehicle travel route requests for vehicle travel from positions A to position B for vehicle 53 and for vehicle travel from position D to position C, for vehicle 56. Consider also that the interlocking 55 is at this time aligned in the normal position. It follows therefore that the operational characteristic of the logic circuit 9, as described for the vehicle 53, traveling from position A to B will be identical as the operation as described for the vehicle 2 traveling from position A to position B in FIG. 2.

The oscillator 27 provides a 155 kilohertz signal to the signal input terminals of AND gates 59, 60 and 61. Since the vehicle 56 has entered a normal travel route request, it is either present in zone 6 or zone 7. Therefore, the AND gate 59 and/or the AND gate 62 are disabled at this time as the zone 6 unoccupied signal (Z6U) is at a zero level at this time. Therefore, the AND gate 59 provides no signal input to the AND gate 62. Therefore regardless of the signal value at the control terminal of the AND gate 62, there is no signal output from the last named AND gate. The detector 63 in response to the zero signal output from the AND gate 62 provides a zero signal output. The resultant zero signal output level from the detector 63 is applied to the input of an inverter 64 which in response to the latter signal applies a negative control signal to the control input terminal of the AND gate 60. In response thereto, a 155 kilohertz control signal is provided at the output of the AND gate 60 which is applied in turn to the signal input terminal of an AND gate 65 and a first signal input terminal of an OR gate 66. Since the interlocking of switch 55 is in the normal position at this time, an interlocking (switch) in normal position (SWN) signal is applied to the control terminal of the AND gate 65 and in response thereto the AND gate is enabled and provides a 155 kilohertz signal to the input of a detector 66 which in response to the latter signal provides a negative control signal to the control terminal of a latch 67. The latch 67 is receiving at this time at its signal input terminal a 155 kilohertz signal from the AND gate 61, as it is assumed that zone 8 is unoccupied at this time and therefore that a zone 8 unoccupied signal of a negative level (Z8U) is applied to the control terminal of the AND gate 61. The resultant 155 kilohertz output signal from the latch 67 is applied to the signal input terminal of an AND gate 68 which has the switch in normal position (SWN) signal, which is at a negative level at this time, applied to its control input terminal thereby enabling the AND gate 68 which in turn provides at its output a 155 kilohertz open gate B signal which is provided to the vehicle detection and signalling equipment 18 which in turn opens gate B and allows the vehicle 56 to enter vehicle zone 8 and proceed to its destination position C. Once the vehicle 56 enters zone 8, the zone 8 unoccupied signal (Z8U) returns to a zero level, and the AND gate 61 is disabled and accordingly the open gate B signal is terminated and a gate B closed signal is provided to block entry of any following vehicles into zone 8 while zone 8 is still occupied by the vehicle 56. Consider now the situation in which the vehicles 53 and 56 each make a normal travel route request but however, the interlocking is in a crossover position. As was previously described, the AND gate 60 is providing a 155 kilohertz control signal at its output which is applied to the AND gate 65 and the OR gate 66. The AND gate 65 is disabled at this time as the interlocking (switch) in normal position (SWN) signal is at a zero level at this time and consequently, there can be no open gate B signal provided at the output terminal 69 and consequently a gate B close signal is provided at the output terminal 70 by way of the inverter 71 and the detector 72. The OR gate 66 therefore passes the 155 kilohertz signal from the AND gate 60 to the input of the signal input of the AND gate 73. It is assumed that the vehicle detection zone Z8 is unoccupied at this time and therefore the zone 8 unoccupied signal (Z8U) which is at a negative level at this time is applied to the control terminal of the AND gate 73 and in response thereto a 155 kilohertz signal is applied to the signal input terminal of the AND gate 41. Since the vehicle detection zone 3 is assumed to be unoccupied at this time, the zone 3 unoccupied signal (Z3U) is at a negative level at this time and is applied to the control input terminal of the AND gate 41 and in response thereto, a 155 kilohertz signal is applied to signal input terminal of the AND gate 48. The gates properly closed signal for gates (A and B), GPC (A and B) are at a negative level at this time, as will be subsequently explained. Therefore the AND gate 48 which is enabled in response to the latter signals applies a 155 kilohertz "align interlocking in normal position signal" by way of the output terminal 37 to the interlocking track circuit equipment 8 as shown in FIG. 1 such that the interlocking may be aligned in the normal position.

In response to the interlocking being aligned in the normal position, the AND gate 65 receives a negative SWN signal at its control terminal and the open gate B signal is then provided as previously explained. In turn, the open gate A signal is also provided as was explained in conjunction with FIG. 2. It is to be appreciated that in all cases in which an interlocking is to be realigned or an open gate signal is to be generated that these signals may not be generated if either zone 3 or zone 8 are occupied since zone unoccupied signals control the operation of the AND gates through which the control signal is routed prior to its being sent to the interlocking and the signalling equipment. Also, if the vehicle 53 enters a vehicle travel route request for the crossover (X-over) position, and the interlocking is aligned and locked in that position, the switch normal (SWN) signal applied to the control terminals of AND gates 65 and 68 is at a zero level disabling these gates, and accordingly no "open gate B" signal is provided and gate B is closed blocking entry of vehicle 56 into zone 8.

Figure 7:
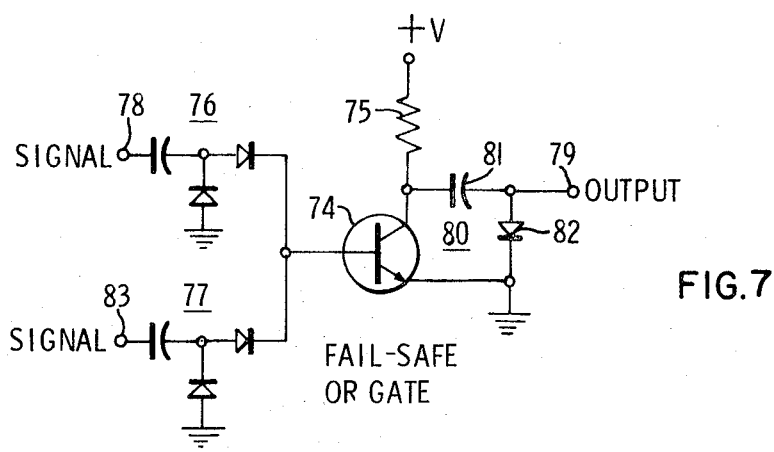
FIG. 7 is an OR gate which may be used in the practice of the present invention.

Refer briefly to FIG. 7 which illustrates a fail-safe OR gate which may be used in the practice of the invention as the OR gate 66 as illustrated in FIG. 4. The fail-safe OR gate illustrated is described in detail in the previously mentioned patent application Ser. No. 116,751. The OR gate is comprised of an NPN transistor 74 which is connected to a source of operating potential +V by way of a resistor 75 and has its emitter electrode connected to circuit ground. There is included a first signal input network 76 and a second signal input network 77, each of which is connected to the base electrode of the transistor. If a signal is applied to the input terminal 78 the signal input network 76 couples the signal to the base electrode of the transistor 74 whereby the transistor becomes conductive and the input signal is essentially reproduced at the terminal 79 by way of a level shifting network 80 which is comprised of a capacitor 81 and a diode 82. If a signal is applied to the signal input terminal 83 it is coupled by way of the signal input network 77 to the base electrode of the transistor 74 and the input signal is essentially reproduced at the output terminal 79. This circuit is fail-safe and as a result of any circuit component failures there is no signal provided at the output terminal 79 as is explained in the last-named patent application.

Figure 8:
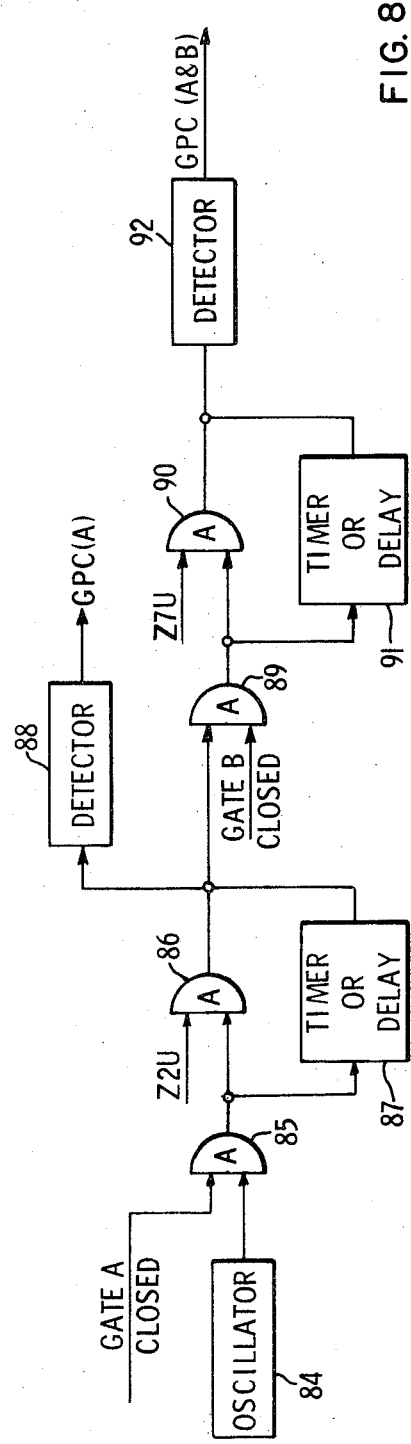
FIG. 8 is a block diagram representation of a circuit for providing control signals used in the logic circuits of FIGS. 2 and FIGS. 4.

Refer briefly to FIG. 8 which is a logic diagram of the circuit necessary to provide the "gates properly closed signals" which are applied to the AND gates 48 and 52 as illustrated in FIG. 2 and FIG. 4, respectively. It is necessary to provide such a signal to these AND gates to insure that the "align interlocking signals" are not provided in the event that a vehicle is present in the vehicle detection zone preceding the vehicle detection zone wherein the interlocking is located unless the vehicle has time to stop prior to reaching the vehicle detection zone wherein the interlocking is situated, for example zones 3 and 8, or alternatively has time to enter the interlocking prior to the initiation of its movement. An oscillator 84 provides a 155 kilohertz signal to an AND gate 85. The control input terminal of this AND gate receives a gate A closed signal. This signal is provided from the interlocking logic control circuit 9 when the gate A is closed and the AND gate 85 then provides a 155 kilohertz signal to the input of an AND gate 86 and to the input of a timer or delay network 87. The AND gate 86 has provided to its control input terminal the zone 2 unoccupied signal. Therefore, if there is no vehicle present, in vehicle detection zone 2 the AND gate 86 is enabled and in turn a 155 kilohertz signal is provided at its output which is coupled to a detector 88 which applies a gate properly closed signal, GPC(A) to the AND gates 48 and 52 respectively in FIG. 2. If vehicle detection zone 2 is unoccupied, this is a safe condition for the system parameters are such that a vehicle in vehicle detection zone 1 would not have time to enter vehicle detection zone 2 and subsequently zone 3 prior to the interlocking 6, as shown in FIG. 1, being moved. A second condition which may exist is if vehicle detection zone 2 is in fact occupied by a vehicle. If such is the case, the AND gate 86 is disabled and the timer or delay network 87 delays the input signal for a time sufficient that the vehicle could be brought to a stop at gate A or if proceeding into zone 3 the movement of the interlocking would be inhibited which also is a safe condition. A situation such as this would arise if a vehicle made a vehicle travel route request at too late of an interval of time, for example a finite amount of time prior to its reaching gate A.

If an interlocking system is provided as shown in FIG. 3 then the following logic circuit elements are also needed. The signal provided at the output of the AND gate 86 or the timer 87 is then coupled to the signal input terminal of an AND gate 89. A gate B closed signal is provided to the control terminal of the AND gate 89 and in response thereto a 155 kilohertz signal is provided to the signal input of an AND gate 90 and to the input of a timer or delay network 91. If vehicle detection zone 7 is unoccupied, there is no safety problem, for the same reasons as given in regard to zone 2, and a zone 7 unoccupied signal (Z7U) is applied to the control input of the AND gate 90 and in response thereto a 155 kilohertz signal is provided to a detector 92 which provides a gate properly closed signal, GPC (A and B) to the AND gates 48 and 52 as illustrated in FIG. 4 such that the interlocking may now be aligned to the proper position. If however, zone 7 is occupied at this time, the gate 90 is disabled and the timer or delay network inhibits the generation of the gate properly close signal until a sufficient amount of time has passed such that the vehicle 56 (as shown in FIG. 3) has time to one of stop in vehicle detection zone 7 or to pass through the interlocking in zone 8 prior to an align interlocking signal being generated.

It is to be appreciated that more complex vehicle travel path and vehicle travel route designs such as double cross-overs, may be constructed using the same logic elements and theory of operation as described for the vehicle travel paths illustrated in FIG. 1 and FIG. 3 respectively.

In summary, a fail-safe electronic logic network has been described in which interlocking control and command signals are provided as well as vehicle signal commands are also provided for stopping or permitting a vehicle to enter a vehicle detection zone in which an interlocking is included. The logic circuit described is fail-safe, relatively inexpensive, occupies little space, consumes small amounts of power and performs all of the functions that were previously performed by interlocking control circuits utilizing vital relays.

What is claimed is:

1. In a vehicle control system wherein a vehicle travels along a vehicle travel path divided into a plurality of vehicle detection zones which include at least first and second travel routes, with an interlocking included in at least one of said vehicle zones which may be aligned in a first position for travel along said first vehicle travel route, and which may be aligned in a second position for travel along said second vehicle travel route, the combination comprising:
   a first electronic gate responsive to the provision of a signal indicative of the presence of said vehicle in a vehicle detection zone preceding said one vehicle detection zone concurrent with the provision of another signal indicative of a vehicle travel route request for said vehicle for providing a first signal;
   a second electronic gate responsive to the provision of said first signal concurrent with the provision of a signal indicative of said interlocking being aligned in a position necessary to meet said vehicle travel route request for providing a second signal;
   means responsive to the provision of said second signal and the provision of a signal indicative of the absence of another vehicle in said one vehicle detection zone for providing a third signal indicative that said vehicle may be allowed to enter said one vehicle detection zone; and
   a third electronic gate responsive to the provision of said first signal concurrent with the provision of a signal indicative of the absence of a vehicle in said one vehicle detection zone for providing a fourth signal indicative that said interlocking may be realigned from one position to the other.

2. The combination claimed in claim 1 including means for blocking the provision of said fourth signal in the event said vehicle has time sufficient to enter said one vehicle detection zone during the time said interlocking is being realigned.

3. The combination claimed in claim 2 including means for blocking the provision of said third signal in the event said interlocking is not properly aligned.

4. The combination claimed in claim 3 wherein the means for providing said third signal includes an electronic latch circuit.

5. The combination claimed in claim 4 wherein said first, second, and third electronic gates each comprise AND gates.

6. The combination claimed in claim 5 wherein said AND gates are fail-safe.

* * * * *